July 17, 1956  C. GIANINI  2,754,812
SYSTEM OF CARBURATION FOR INTERNAL COMBUSTION ENGINES
Filed March 30, 1954  3 Sheets-Sheet 1

INVENTOR:
Carlo Gianini
BY *A. John Michel*
ATTORNEY

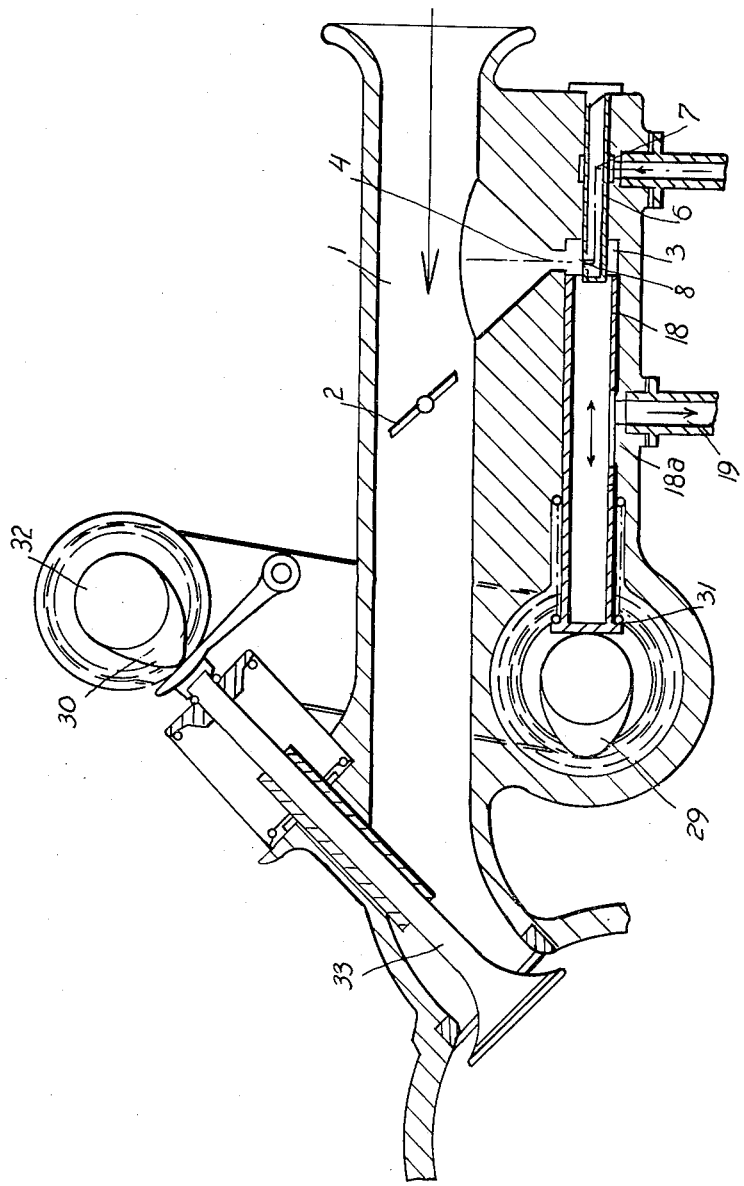

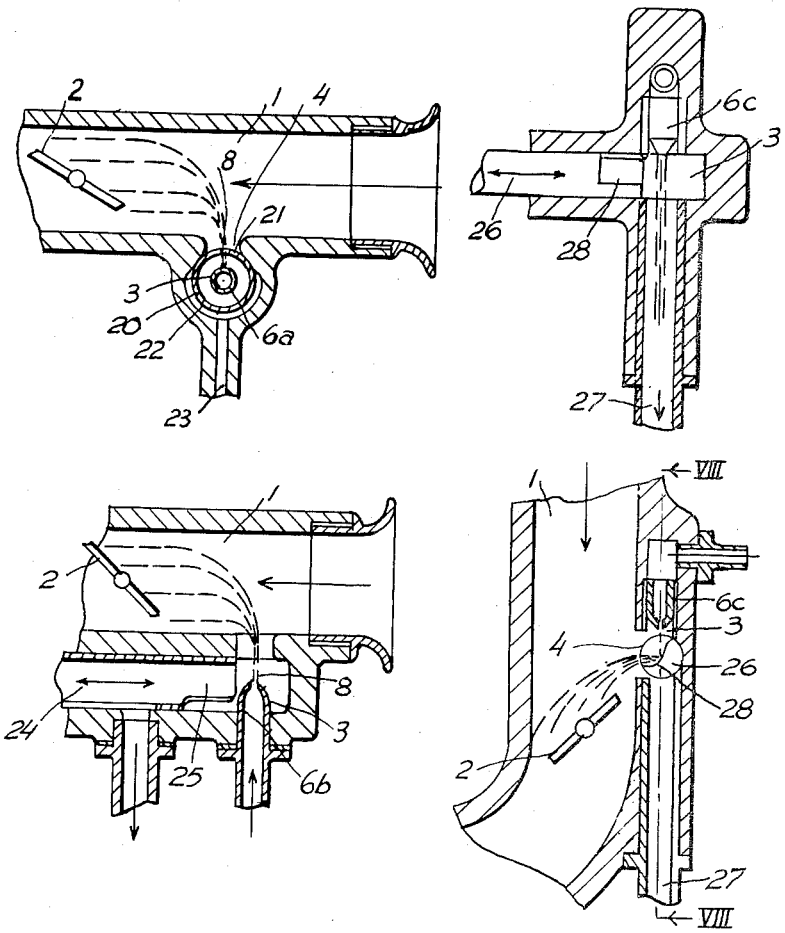

United States Patent Office 2,754,812
Patented July 17, 1956

2,754,812
SYSTEM OF CARBURATION FOR INTERNAL COMBUSTION ENGINES

Carlo Gianini, Rome, Italy

Application March 30, 1954, Serial No. 419,877

Claims priority, application Italy April 4, 1953

7 Claims. (Cl. 123—119)

This invention provides a system of carburation for an internal combustion engine, wherein the fuel flows under pressure in a continuous stream which follows a predetermined circuit, the aforesaid stream being deflected in the cylinder intake pipe by means of mechanical devices operating in timed relation with the engine cycle so that the beginning of the deflection of the stream and the duration of the said deflection is synchronized with the beginning and the duration of the intake stroke of the engine, means being provided which keep the fuel under pressure and control the pressure in such a way that the ratio of the fuel-air mixture remains constant under all operating conditions.

The aforesaid system may be used in internal combustion engines in the place of the standard carburettor commonly in use at the present time. The fuel emerges under pressure in a constant flow from the port or vent of the injector, whilst a mechanical deflector device/or baffle is interposed in the stream at a predetermined time, the stream being thus deviated in the intake pipe exactly in the intake phase, the stream following its standard course in the collector pipe of the fuel circuit at the end of the intake phase so as to prevent any fuel storage in the intake pipe.

The fuel under pressure flows from the injector, the said injector having specially shaped nozzles; the injector may be provided for instance with a set of aligned little holes, or with a sole thin elongated vent in such a way that the flowing stream appears in the first case as a set of jet sprays placed on the same plane, or, in the second case, as a continuous laminar jet; the fan-shaped/or lamina-shaped jet has preferably the direction of the air stream in the intake pipe.

The air stream hits the fan-shaped/or lamina-shaped stream and effects the atomization of the fuel. The proportion of fuel to air in the mixture which is drawn in by the engine may be kept constant by means of a device which regulates the pressure of the fuel supplied to the injector; the aforesaid control device works for instance according to a function of the variations of the engine revolutions and of the density of the air in the intake conduit, and that on account of interposed suitable control means.

Some embodiments of means for carrying out the invention will be described by way of example and without limitation, with reference to the accompanying diagrammatic drawings in which:

Fig. 4 is a longitudinal section of another embodiment in which the injector is immovable, and the deflector device is movable;

Fig. 5 is a longitudinal section of a third embodiment in which the injector is immovable and the fuel flow interruption is provided by means of a shaped deflector device which rotates without any stop;

Fig. 6 is a longitudinal section of a variation of the embodiment shown in Fig. 4;

Figs. 7 and 8 show respectively a longitudinal and a cross section on line VIII—VIII of Fig. 7 of another embodiment.

Figure 1:
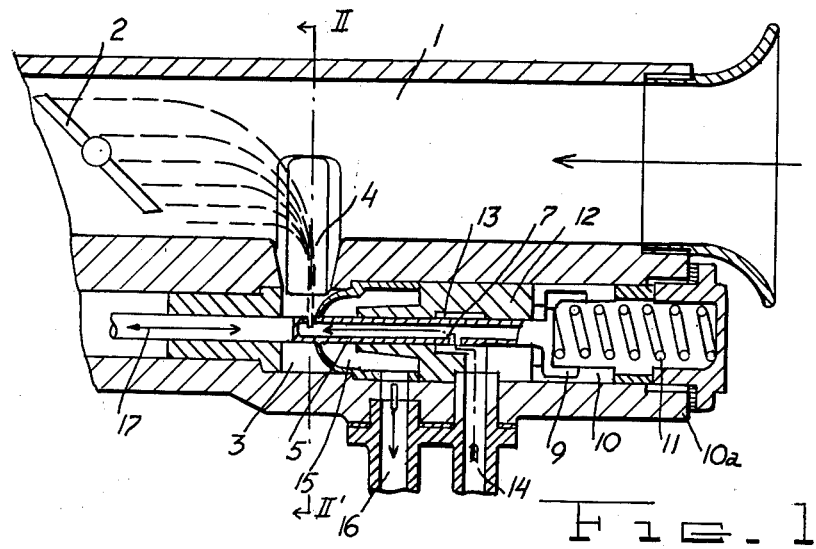
Fig. 1 is a longitudinal section of one embodiment of a carburettor and of its members according to the present invention, wherein the intermittent flow of fuel is obtained by means of a reciprocating motion of the injector.

Referring to the drawings, the intake pipe is the member through which the air and the fuel are drawn in and forced into the cylinder of the engine; a throttle 2 or any other suitable control device, such as a slide valve or a guillotine valve, is placed in the intake pipe 1. The injector and the deflector device are arranged in a cavity 3 which is in communication with the inside of pipe 1 (the cavity 3 being placed in the inferior part of pipe 1 of the embodiments shown in Figs. 1–6; cavity 3 may also be placed laterally). The axis of cavity 3 of the embodiments shown in the accompanying drawing is in the same plane with the axis of pipe 1: yet if necessary for the arrangement and operation of the control members of the deflector device, the aforesaid axes may be oblique, the one with respect to the other. Cavity 3 communicates with the inside of pipe 1 by means of a suitably shaped aperture 4.

The illustrated embodiments may be divided in two groups: the first group includes the embodiments in which injector 5 is movable (Figs. 1–3), the second one includes the embodiments in which the injector 6 is immovable (Figs. 4–8).

Figure 2:
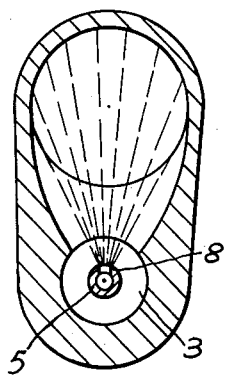
Fig. 2 is a section along line II—II of Fig. 1.
Figure 3:
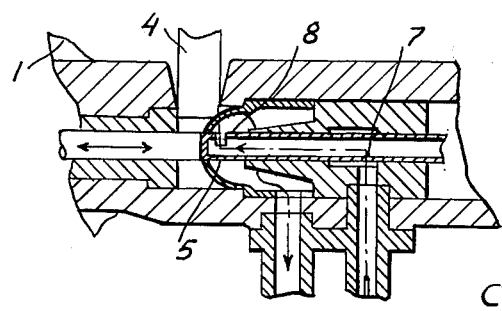
Fig. 3 is a longitudinal section of a detail of the injector shown in Fig. 1.

Referring to the embodiment shown in Figs. 1–3 the injector 5 comprises a partially hollow rod having closed ends, the internal cavity having two apertures 7 and 8; aperture 7 in the central part of the cavity is used for supplying the fuel into the said cavity; aperture 8 is placed at one end of the cavity of the rod in such a location that it allows the cavity of the rod to communicate with cavity 3. The aforesaid aperture 8 is arranged so that it may register with aperture 4 and constitutes the adjusted outlet aperture for the fuel. The aperture 8 may have a round, elliptical or vent-shaped section or the like.

The particular shape of the injector 5, which may be polygonal for instance, or the presence of one or more projecting parts 9 which mesh in guide slots 10, holds the injector against rotation, the guide slots 10 being located on the wall of member 10a in which the said injector has its seat. A spring 11 engages one end of the injector 5 said spring keeping the said injector in its advanced position. The injector is supported by a member 12 which serves as a guide for its shifting. The member 12 has a cavity 13 to which the fuel under pressure is supplied by the pipe 14: aperture 7 always communicates with the cavity 13 whatever position the injector 5 has. For this reason the fuel flows constantly from port 8 in the shape of thin cylindrical jets or of a lamina-shaped jet; when the injector is in its advanced position (Fig. 1), the fuel jet is sent into the intake pipe 1 because port 8 is placed in the cavity 3. A cap-shaped deflector device 15, coaxial with the injector 5 and the member 12, has a hole with cutting edges, placed on the top or vertex of its dome. The injector 5 slides through this hole during its backward stroke whereby outlet port 8 passes inside the cap 15, staying there during all the time in which the intake phase is interrupted (Fig. 3). The fuel jet, which flows continuously from the injector and is drawn in the intake pipe 1 during the intake phase (active intake phase), is collected by the deflector cap 15 in the successive phase; the said fuel jet is then directed through the pipe 16 by the recycling pump which is a part of the system, and is returned to the reservoir (those members not being shown in the drawings). The displacement of the injector is controlled by means of the head 17 which in turn moves in phase with the engine on account of the action of the members which operate the engine timing gears/or on account of a suitable device (camshaft) which is supported by the carburettor axis and rotates suitably in phase with the engine.

The injector 6 of the embodiment shown in Fig. 4 is immovable, whilst the deflector device/or baffle 18 is movable. When the injector 6 is in the position shown in Fig. 4, its jet goes inside the intake pipe 1, but when member 18, which is operated by means of a mechanism moving in phase with the engine, shifts so as to close the aperture 4, the flow of the fuel jet in the intake pipe is interrupted and is deflected inside member 13 provided with an outlet aperture 18a; the fuel jet passes then through the aforesaid aperture 18a and enters in pipe 19, the recycling pump operating so as to return the said fuel jet inside the reservoir. As shown, cam 29 controls the movable baffle 18, said cam being actuated by engine shaft 32 which operates intake valve 33 of the cylinder by means of principal cam 30, cams 29 and 30 being so positioned in relation to each other that, during the engine intake phase when intake valve 33 of the cylinder opens, deflector 18 is in its backward position, whereby the nozzle 8 of injector 6 is in communication with intake duct 1, while the deflector is interposed between aperture 4 and nozzle 8 during all other engine phases and the fuel flows back to the reservoir.

The embodiment of Fig. 5 has an immovable injector 6a which is placed inside a hollow body 20 having an injection vent 21. The hollow body 21 rotates in phase with the engine but with an angular velocity which is half the velocity of the driving shaft, in such a way that when vent 21 is placed in registry with the aperture 4 of the intake pipe 1, the passage of the fuel jet into the intake pipe 1 is free; when the full wall of the body 20 closes the aperture 4, the aforesaid fuel jet is shifted by the wall, taken inside the cavity 22 and drawn in by the pump connected with the collector pipe 23. Obviously other ports or passages may be arranged in the hollow body 20, but they will never be opposite to the aperture 4, the aforesaid passages/or vent allowing the fuel passage into the cavity 22, the drawn off fuel being that which was collected in the annular cavity placed between the pipe 6a and 20, when the injection was stopped. If the body 20 rotates with ¼ of the angular velocity of the driving shaft, two vents 21 would be placed so as to form an angle of 180° between them, so as to facilitate the release of the fuel from the body 20. If the engine is of the multicylinder type, the cylinders being placed side by side as it generally happens (four or six cylinders for instance), the axes of the intake pipes 1 may be parallel; the hollow body 20 in this case may be unique and engage all the mixing intake pipes. Obviously the body 20 will have in this condition as many vents 21 as many intake mixing pipes there are, the aforesaid vents being placed in registry with the respective cavity 3 of the aforesaid intake mixing pipes, and being suitably angularly phased. The jet-supporting pipe 6a will extend the entire length of the case and will have an adjusted opening 8 for every mixing intake pipe.

It must be noted that the injector 6a may also rotate with the body 20 that is to say it may also be connected with the body 20. If the jet-supporting pipe 6a is at a standstill, the adjusted openings 8 must have axes resting on the same plane on which the axes of the vents 21 rest (upwards oriented in the embodiment shown in Fig. 5); if the pipe 6a rotates with the body 20 the adjusted openings 8 will have the same angular position which is had by the corresponding vents of the hollow body 20.

The fuel collecting conduit 22 which extends under the intake pipes 1 may be unique and have one/or many collecting inlets 23. The embodiment illustrated in Fig. 6 is functionally similar to the embodiment shown in Fig. 4; it differs from it only because it has the injector 6b so placed as to be perpendicular with regard to the axis of the intake pipe 1 (and this allows a greater simplicity in its use), and because the deflector device 24 is differently shaped, having a lateral cut 25 which is placed in registry with the injector, so as to allow the passage of the said member.

The embodiment shown in Figs. 7 and 8 has an immovable injector 6c which draws in directly the fuel jet into the recovering pipe 27 when the cylinder is not in the intake phase (Fig. 8); the fuel is drawn in the intake pipe when the member 26 is placed under the fuel jet, the aforesaid member 26 being operated by means of a device which works in phase with the engine. The member 26 has a suitably shaped surface which may laterally deflect the fuel jet; the said deflection takes place in phase with the intake stroke of the engine.

It must be noted that the embodiments illustrated here above are to be considered as illustrative examples without limitation. It was supposed that the injector 5 of the embodiment shown in Figs. 1–3 which moves intermittently, be in its standard/or steady position in correspondence with the intake phase of the intake pipe; the regenerating position is reached on account of the control device 17 which is operated by the engine shaft. The operation will be substantially the same in the case in which the injector 5 works so that it reaches the fuel intake position on account of the action of the control device and passes on its recovering position (standard/or steady position) on account of the spring recovery. The control may also be had by means of a desmodromic system (for the mechanic control of the forward and the backward stroke).

It is obvious that for practical reasons, embodiments can be foreseen in which both the injector and the deflector device/or baffle be movable and carried out according to analogous principles with respect to the embodiments shown in the drawing.

It must also be observed that, as the fuel outlet aperture of the carburettor carried out according to the present invention has a constant area, and as the intake time for the intake pipe is directly proportional to the opening time of the intake valve, so the fuel must flow from the outlet aperture with a directly proportional speed with regard to the engine revolutions when a constant air-fuel ratio on the power curve is to be had (a more or less braked engine, with a constant maximum opening of the throttle).

When the engine operates on the contrary with a partially opened throttle (utilisation curve), the discharge speed of the fuel must have a further decreasing in function with the variation of the density of the air drawn in by the cylinder so that the more the throttle passes from its maximum to its minimum opening the more the density decreases.

The feeding of the fuel for the injectors must therefore be constantly controlled by suitable devices which keep the air-fuel ratio constant in every running contingency, operating on the fuel pressure.

This control may be effected by means of a volumetric pump (with paddles or gears) which has one or many outlet apertures placed in parallel with the feeding pipe of the injectors, the section of the said outlet aperture varying by means of a suitable control device which works accordingly to the variation of the density of the air intaken by the cylinders (for instance a manometric cap control device); it can also work indirectly according to the position of the throttle (coneshaped needle having predetermined sections, operated by means of the same controls of the throttle/or throttles).

If a constant pressure pump is used instead of the volumetric pump, the pressure must be controlled not only by the densymetric control device but also as a function of the engine revolutions, and this by means of the insertion of a centrifugal regulator for instance.

A recycling pump recovers the fuel which flows from the injectors during the inactive phases; the aforesaid pump receives the fuel from the deflector collecting chamber and sends it to the reservoir thus preventing any fuel storage in the deflector device or baffle. These devices are not illustrated in the drawings, being known devices.

The present invention may be used for the separate feeding of each cylinder of an engine (a four-cylinder engine will have four similar devices). Also, a single mixing device can be used for the feeding of two contiguous cylinders (three mixing devices in the case of six cylinders) when the duration of the phase which controls the intake of the fuel in the intake pipe 1 is suitably increased.

I claim:

1. A method of carburation for an internal combustion engine having a cylinder with an intake conduit, comprising the steps of feeding under pressure a continuous stream of fuel to an injector device having an outlet nozzle of constant area in communication with the cylinder intake conduit, delivering from said nozzle a continuous stream of fuel at a rate varying as a function of the speed of the engine and of the density of the air in the intake conduit, deflecting the continuous fuel stream delivered from the nozzle at predetermined intervals so as to supply fuel from the nozzle to the intake conduit in phase with the intake stroke of the cylinder, and collecting the deflected fuel, the fuel circulating through the injector device and the nozzle in an uninterrupted stream.

2. A carburation system for an internal combustion engine having a cylinder with an intake conduit, comprising an injector device having an outlet nozzle being in proximity to and adapted to be in communication with the cylinder intake conduit, means for feeding a continuous stream of fuel to said injector device under pressure, mechanical fuel deflecting means associated with said injector device, means for varying the relative position of the injector device and deflecting means in timed relation with the engine cycle, the nozzle being in communication with the intake conduit of the cylinder during its intake stroke and the deflecting means barring said communication during the other phases of the engine, a collecting conduit for collecting the fuel deflected from said nozzle, and recycling means for delivering the collected fuel to the fuel feeding means.

3. The carburation system, of claim 2, wherein said fuel feeding means comprises a pump driven by the engine so that the fuel pressure varies as function of the speed of the engine.

4. The carburation system of claim 3, comprising means for diverting a portion of the continuous fuel stream to the fuel feed means, the volume of said diverted fuel portion being controlled by the air density in the cylinder intake conduit.

5. The carburation system, of claim 2, wherein said injector outlet nozzle is so located in relation to the intake conduit of the cylinder that the fuel stream delivered from the nozzle enters the intake conduit as a transverse jet.

6. The carburation system of claim 2, wherein said means for varying the relative position of the injector device and the deflecting means comprises a means for reciprocating said injector device in timed relation with the engine cycle, the deflecting means being in fixed position.

7. The carburator system of claim 2, wherein said means for varying the relative position of the injector device and the deflecting means comprises means for reciprocating the deflecting means in timed relation with the engine cycle, the injector device being in fixed position.

References Cited in the file of this patent

UNITED STATES PATENTS 2,636,487     Fowler   ---------------- Apr. 28, 1953